US012640123B2

(12) United States Patent
Wish

(10) Patent No.: US 12,640,123 B2
(45) Date of Patent: May 26, 2026

(54) BUCKET TYPE DRUM SET

(71) Applicant: MUSIC WILL, INC., Covina, CA (US)

(72) Inventor: David Wish, Montclair, NJ (US)

(73) Assignee: MUSIC WILL, INC., Covina, CA (US)

( * ) Notice: Subject to any disclaimer, the term of this patent is extended or adjusted under 35 U.S.C. 154(b) by 419 days.

(21) Appl. No.: 18/209,990

(22) Filed: Jun. 14, 2023

(65) Prior Publication Data

US 2023/0395043 A1 Dec. 7, 2023

Related U.S. Application Data

(63) Continuation of application No. 17/830,168, filed on Jun. 1, 2022, now Pat. No. 12,062,352.

(51) Int. Cl.

*G10D 13/02* (2020.01)
*G10D 13/065* (2020.01)
*G10D 13/10* (2020.01)
*G10D 13/11* (2020.01)
*G10D 13/12* (2020.01)

(52) U.S. Cl.

CPC ........... *G10D 13/02* (2013.01); *G10D 13/065* (2013.01); *G10D 13/11* (2020.02); *G10D 13/12* (2020.02); *G10D 13/28* (2020.02)

(58) Field of Classification Search

CPC ...... G10D 13/02; G10D 13/065; G10D 13/11; G10D 13/12; G10D 13/28; G10D 13/00
See application file for complete search history.

*Primary Examiner* — Kimberly R Lockett
(74) *Attorney, Agent, or Firm* — Vedder Price P.C.

(57) ABSTRACT

A drum set comprising a bucket is provided. The bucket can have a top opening, a bottom side, a striking side, an opposing resonant side, and two other sides. A lid is provided to cover the top opening when the drum set is in storage mode. The drum set also has a plurality of upward extending component mounting shafts removably attached to the bottom side of the bucket when the bucket is placed bottom side up. The drum set has one or more percussion modules configured to removably attach to one or more of the plurality of component mounting shafts. The bottom module can include a bottom mounting member removably attached under the top side of the bucket when the bucket is placed bottom side up. The bottom mounting member has at least two bottom clamps configured to clamp at least two sides of the bucket. A drum kick assembly can be removably attached to the bottom mounting member and positioned on the striking side of the bucket and including a beater positioned to strike the striking side of the bucket to produce a sound. A hi-hat pedal assembly can be removably attached to the bottom mounting member and positioned on the resonant side of the bucket.

20 Claims, 18 Drawing Sheets

BUCKET TYPE DRUM SET

CROSS-REFERENCE TO RELATED APPLICATIONS

This application is a continuation of U.S. patent application Ser. No. 17/830,168, filed on Jun. 1, 2022. This application is related to U.S. patent application Ser. No. 17/236,793, filed on Apr. 21, 2021, which is a continuation-in-part of U.S. patent application Ser. No. 17/152,682, filed on Jan. 19, 2021, which is a continuation of U.S. patent application Ser. No. 16/867,519, filed on May 5, 2020, now U.S. Pat. No. 10,896,662, which is a continuation-in-part of U.S. patent application Ser. No. 16/025,876, filed on Jul. 2, 2018, now U.S. Pat. No. 10,714,061, which is a continuation of U.S. patent application Ser. No. 15/430,431, filed on Feb. 10, 2017, now U.S. Pat. No. 10,013,960. This application is also related to U.S. patent application Ser. No. 17/828,364, filed on May 31, 2022. All of the above applications are incorporated herein by reference in their entirety.

FIELD

This disclosure relates generally to musical instruments and more specifically relates to a drum set, and more specifically to a drum set with a bucket type base member (hereafter "bucket") which serves as a container for storing drum components during storage or transportation mode and as a kick drum or cajon-like instrument during operation mode.

BACKGROUND

A drum kit, drum set or trap set is a collection of drums and other percussion instruments set up to be played/struck by a percussionist. The traditional drum kit consists of a mix of drums (classified as classically as membranophones, Hornbostel-Sachs high-level classification 2) and idiophones (Hornbostel-Sachs high-level classification 1, most significantly cymbals but also including the woodblock and cowbell for example). Traditional drum sets are large and comprise both a large number of components and components, many of which, are large in size and difficult to place and transport. Traditional drum sets are not ideal for students because drum sets are both expensive and they take up a lot of space. Traditional drum sets are also not ideal for a classroom setting, where the goal is to teach students how to play the drums. More recently kits have also included electronic instruments (Hornbostel-Sachs classification 53), with both hybrid and entirely electronic kits now in common use.

A standard modern kit, as used in popular music and taught in many music schools, contains: a snare drum, mounted on a stand, placed between the player's knees and played with drum sticks (which may include rutes or brushes); a bass drum, played by a pedal operated by the right foot; and one or more cymbals, played with the sticks.

All of these are classed as non-pitched percussion, allowing for the music to be scored using percussion notation, for which a loose semi-standardized form exists for the drum kit. If some or all of them are replaced by electronic drums, the scoring and most often positioning remains the same, allowing a standard teaching approach. The drum kit is usually played seated on a drum stool or throne. The drum kit differs in general from those traditional instruments that produce melody or chords/pitch per se: even though drums are often placed musically alongside others that do, such as the piano or stringed instruments.

Many drummers extend their kits from this basic pattern, adding more drums, more cymbals, and many other instruments including pitched percussion. In some styles of music particular extensions are normal, for example double bass drums in heavy metal music. On the other extreme but more rarely, some performers omit elements from even the basic setup, also dependent on the style of music and individual preferences.

SUMMARY

The present disclosure provides a drum set with a bucket as a container for storage and as a cajon-like instrument or kick drum.

DESCRIPTION OF EXEMPLARY EMBODIMENTS

Figure 1:
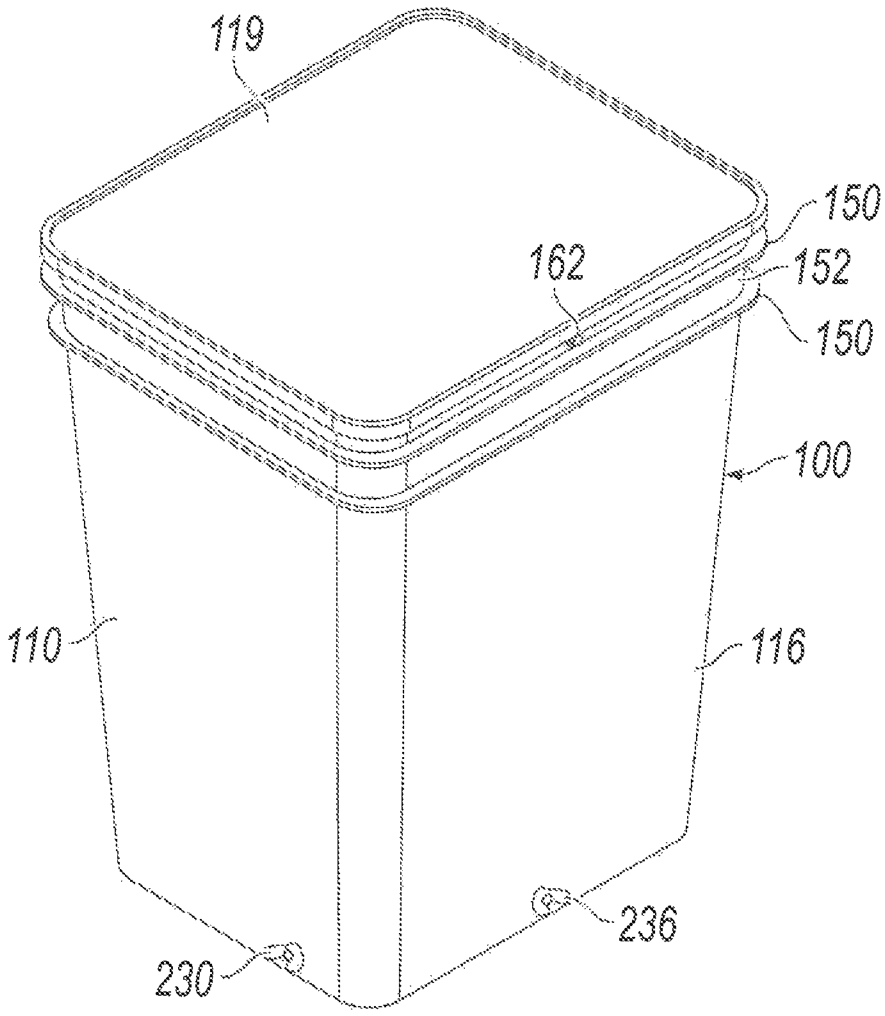
FIG. 1 illustrates a top-rear-right perspective view of an exemplary bucket for drum set that is in a closed, storage or transportation position.
Figure 2:
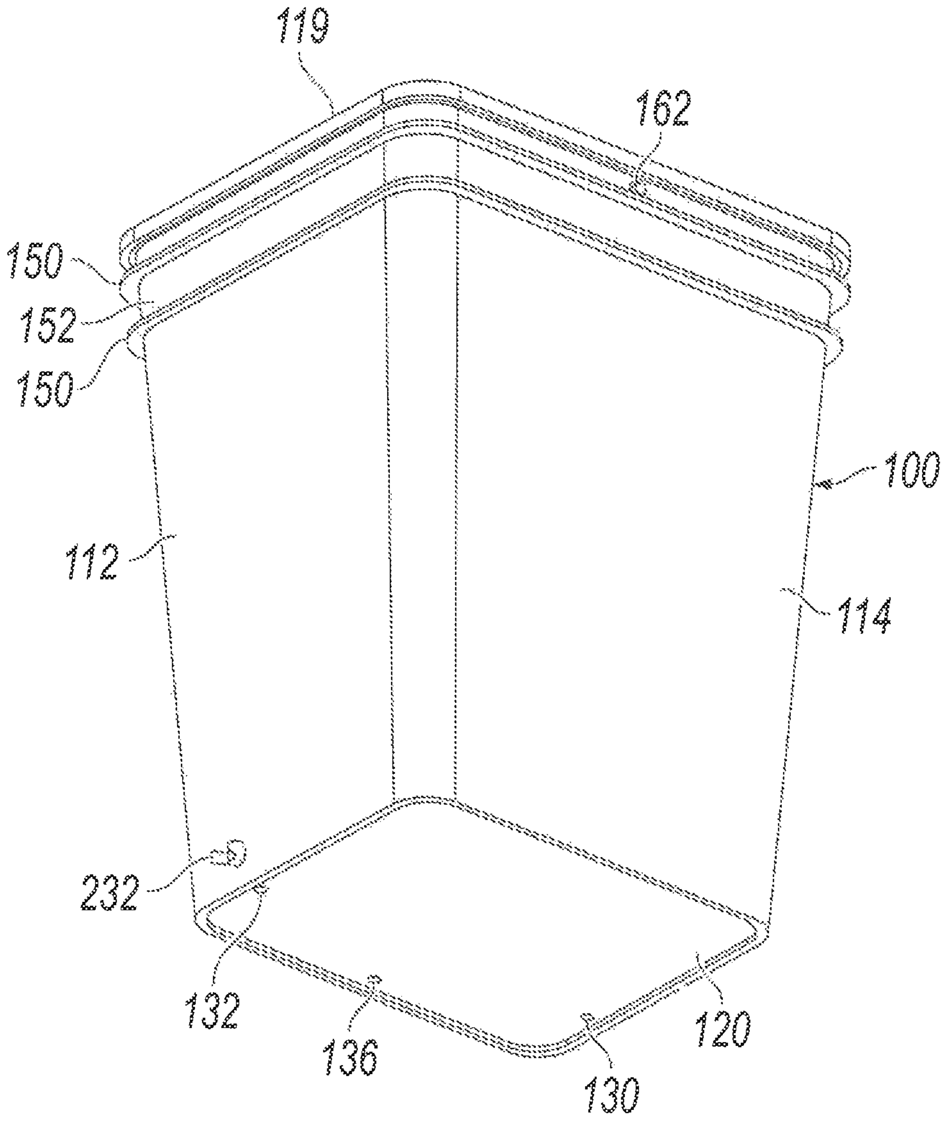
FIG. 2 illustrates a bottom-front-left perspective view of the exemplary bucket for drum set of FIG. 1.
Figure 3:
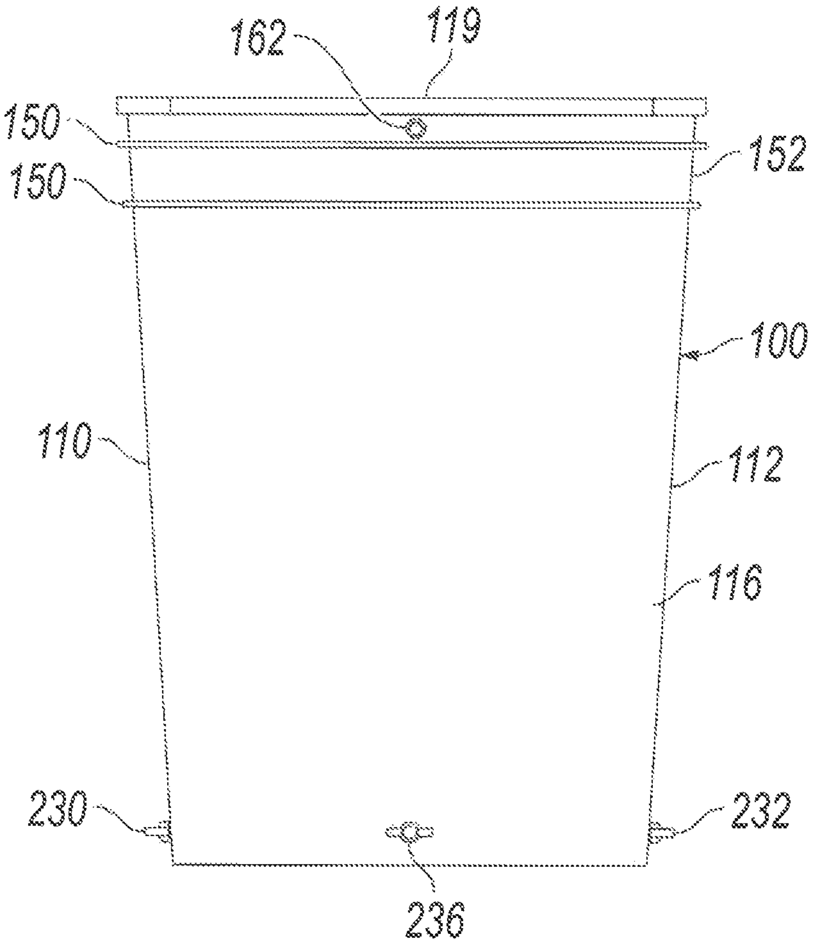
FIG. 3 illustrates a rear view of the exemplary bucket for drum set of FIG. 1.
Figure 4:
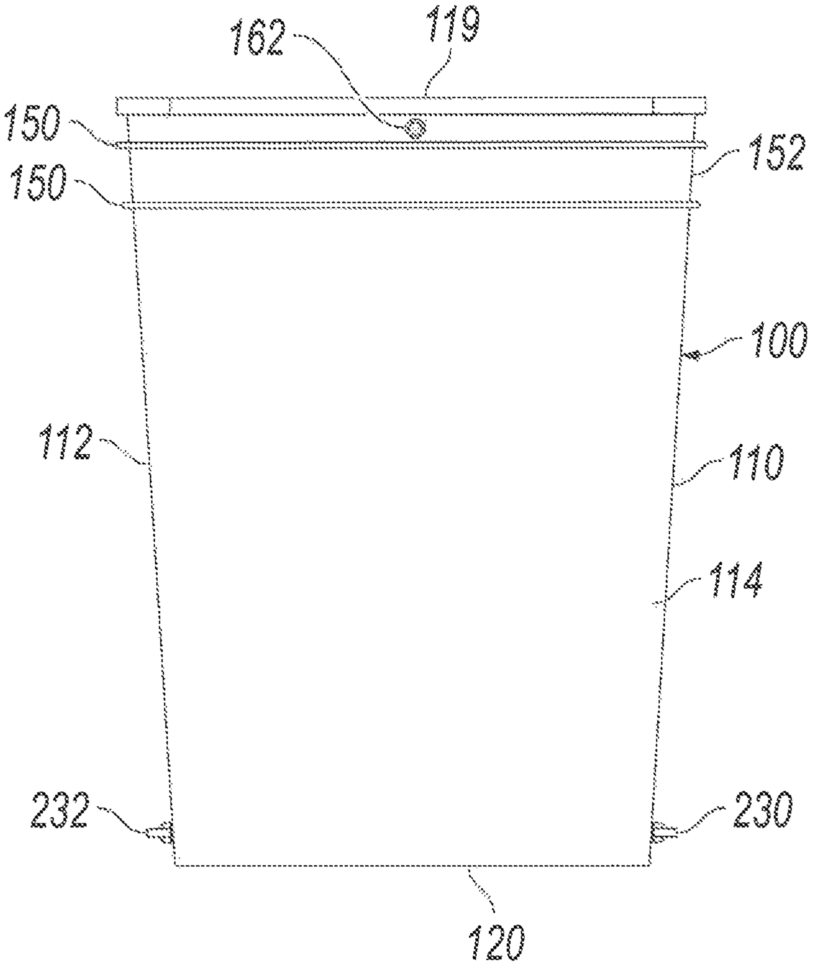
FIG. 4 illustrates a front view of the exemplary bucket for drum set of FIG. 1.
Figure 5:
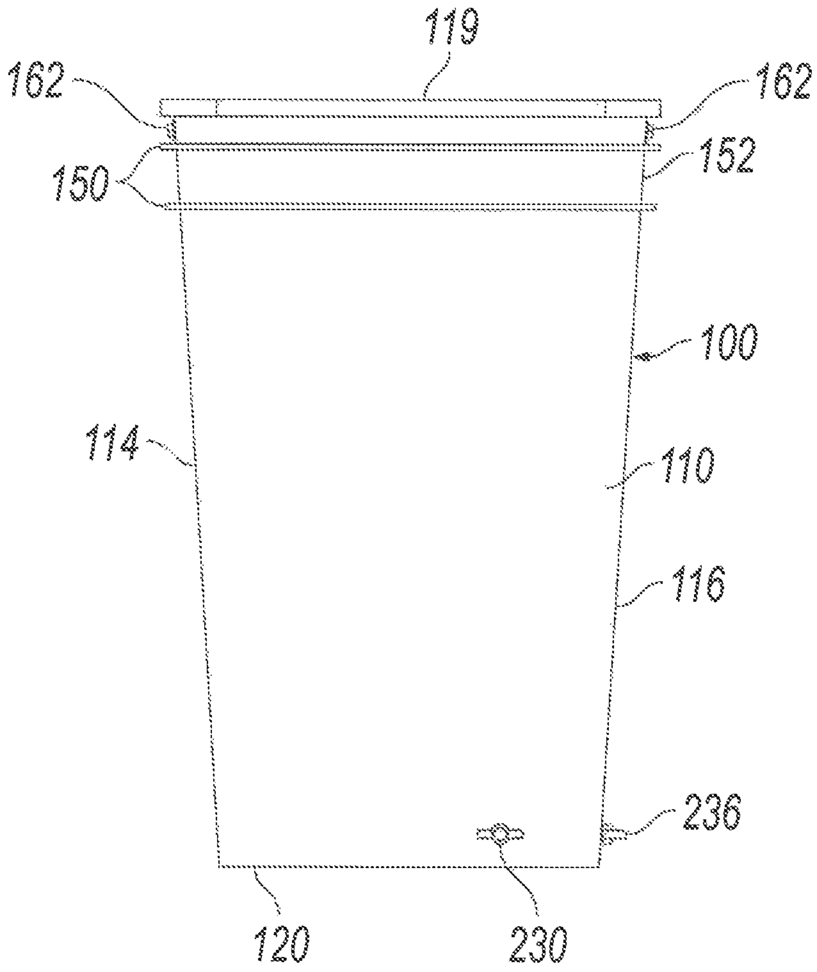
FIG. 5 illustrates a right view of the exemplary bucket for drum set of FIG. 1.
Figure 6:
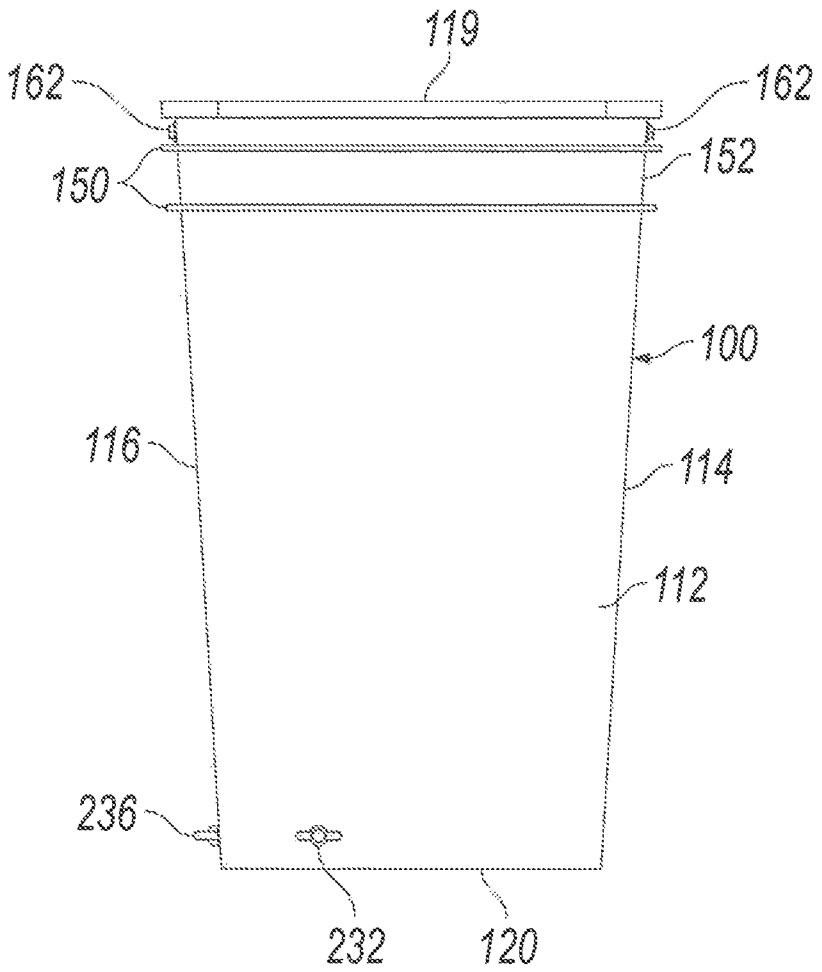
FIG. 6 illustrates a left view of the exemplary bucket for drum set of FIG. 1.
Figure 7:
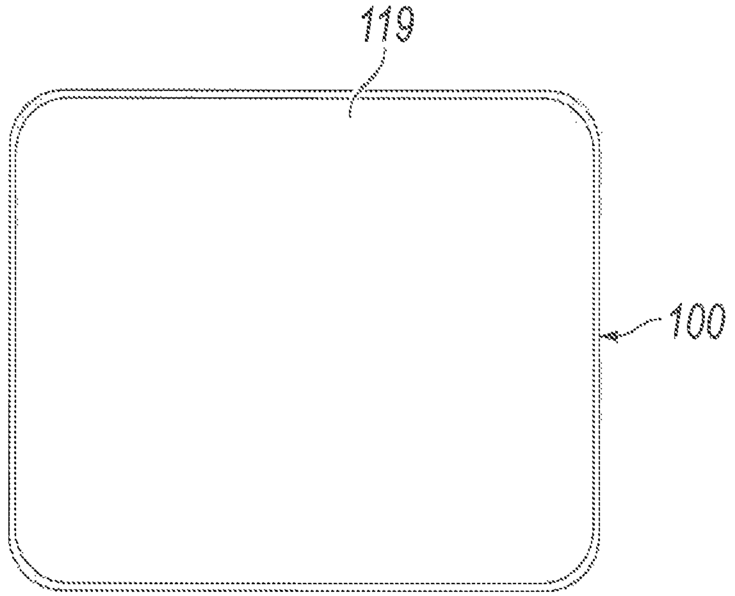
FIG. 7 illustrates a top view of the exemplary bucket for drum set of FIG. 1.
Figure 8:
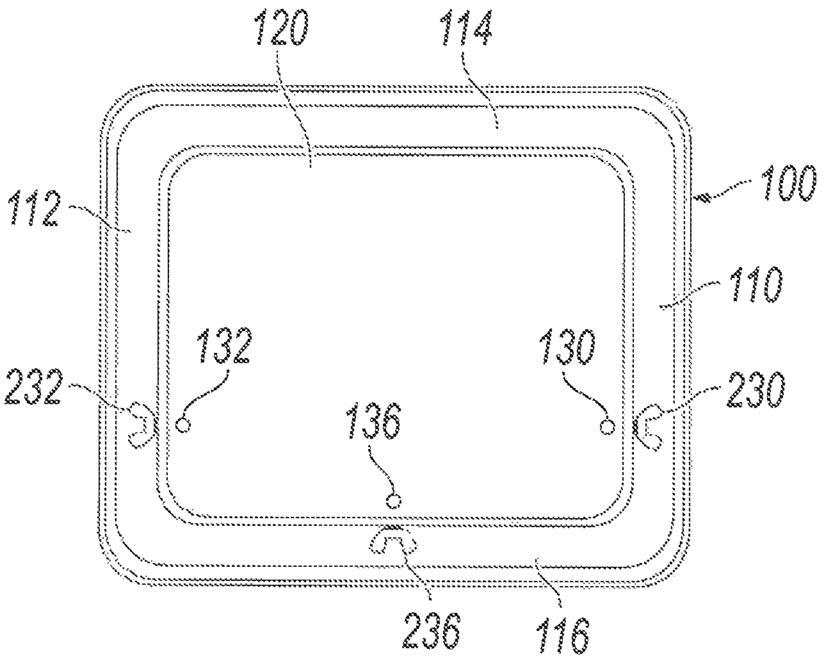
FIG. 8 illustrates a bottom view of the exemplary bucket for drum set of FIG. 1.

The following description includes many specific details, the inclusion of which is for the sole purpose of illustration and should not be understood to limit the invention in any way. Moreover, certain features which are known to those of ordinary skill in the art are not described in detail in order to avoid complication of the subject matter of the present invention. In addition, it will be understood that features in an exemplary embodiment may be combined with features in other exemplary embodiments of the invention without limitation. When practical, the same or similar reference numbers denote the same or similar structures, features, or elements.

It is to be understood that the invention is not limited in its application to the exemplary details of construction and to the arrangements of the components set forth in the following description of exemplary embodiments or illustrated in the drawings of exemplary embodiments. The invention is capable of other alternative embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used in or with other embodiments to yield a still further embodiment. Additionally, certain features may be interchanged with similar devices or features now known or later-developed that perform the same or similar functions. It is therefore intended that such modifications and variations are included within the totality of the present invention.

The figures illustrate exemplary embodiments of a family or series of drum set 10 built by a variety of cajon with convertible top and bottom modules, also referred to as the go drum. Reference now will be made in detail to embodiments of the disclosure, one or more examples of which are illustrated in the figures. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Figure 13:
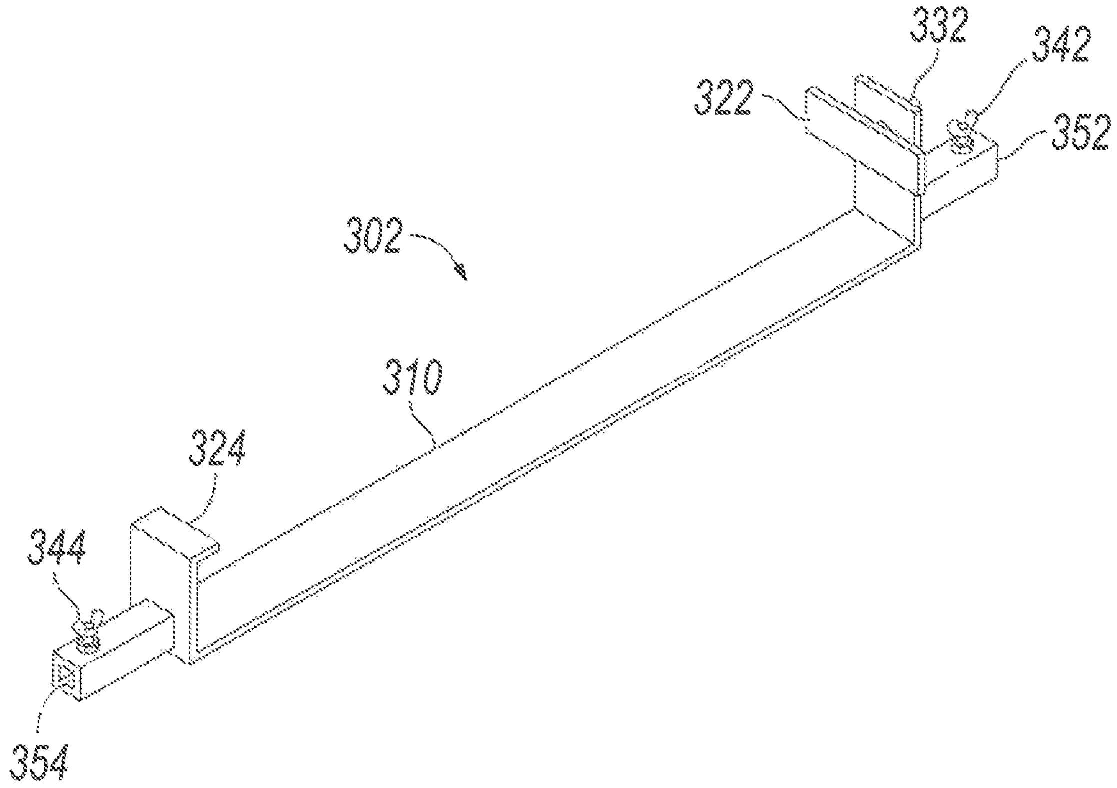
FIG. 13 illustrates a perspective view of an exemplary bottom mounting member.
Figure 14:
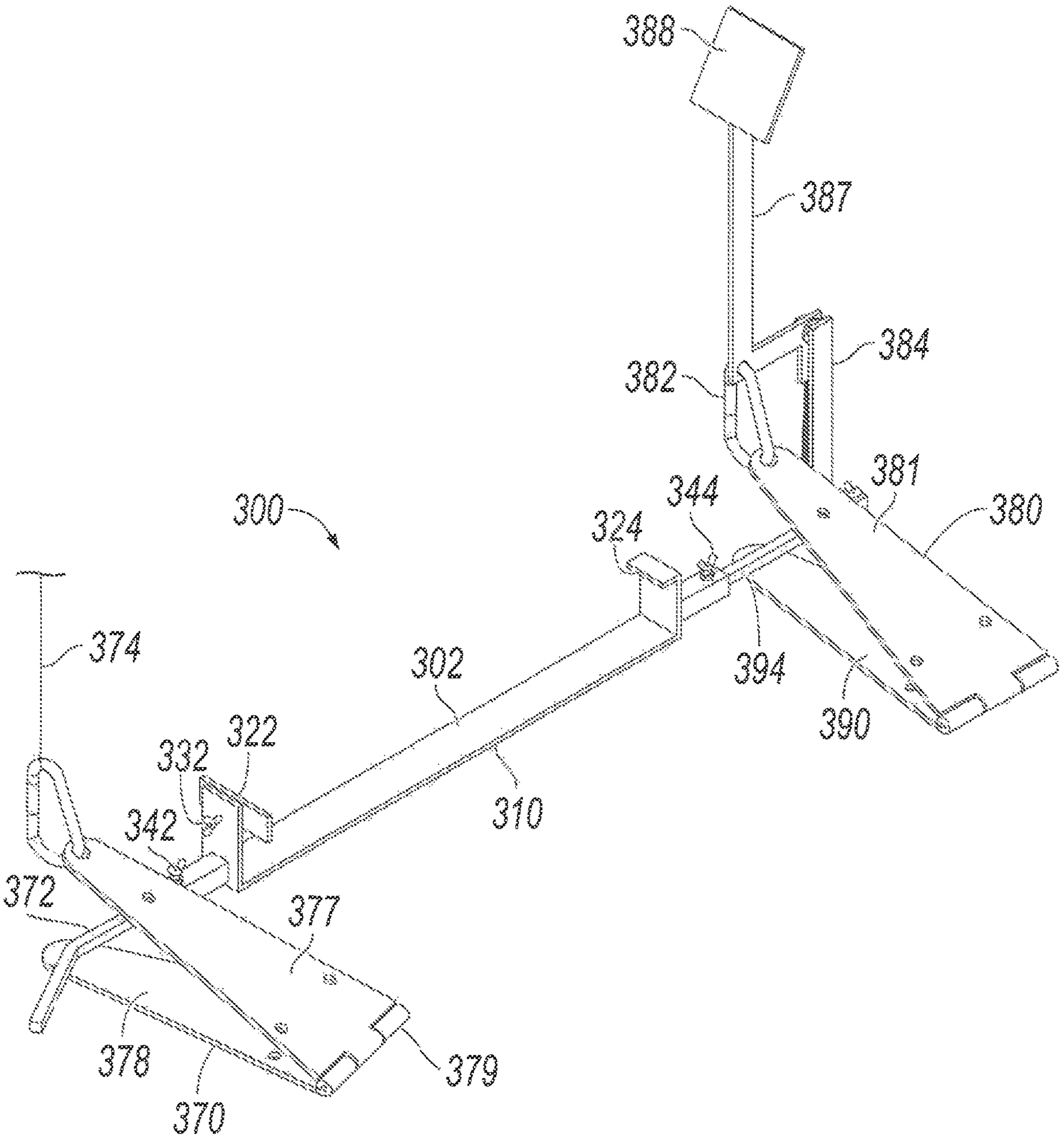
FIG. 14 illustrates a perspective view of an exemplary bottom module for the exemplary drum set of FIG. 1.
Figure 15:
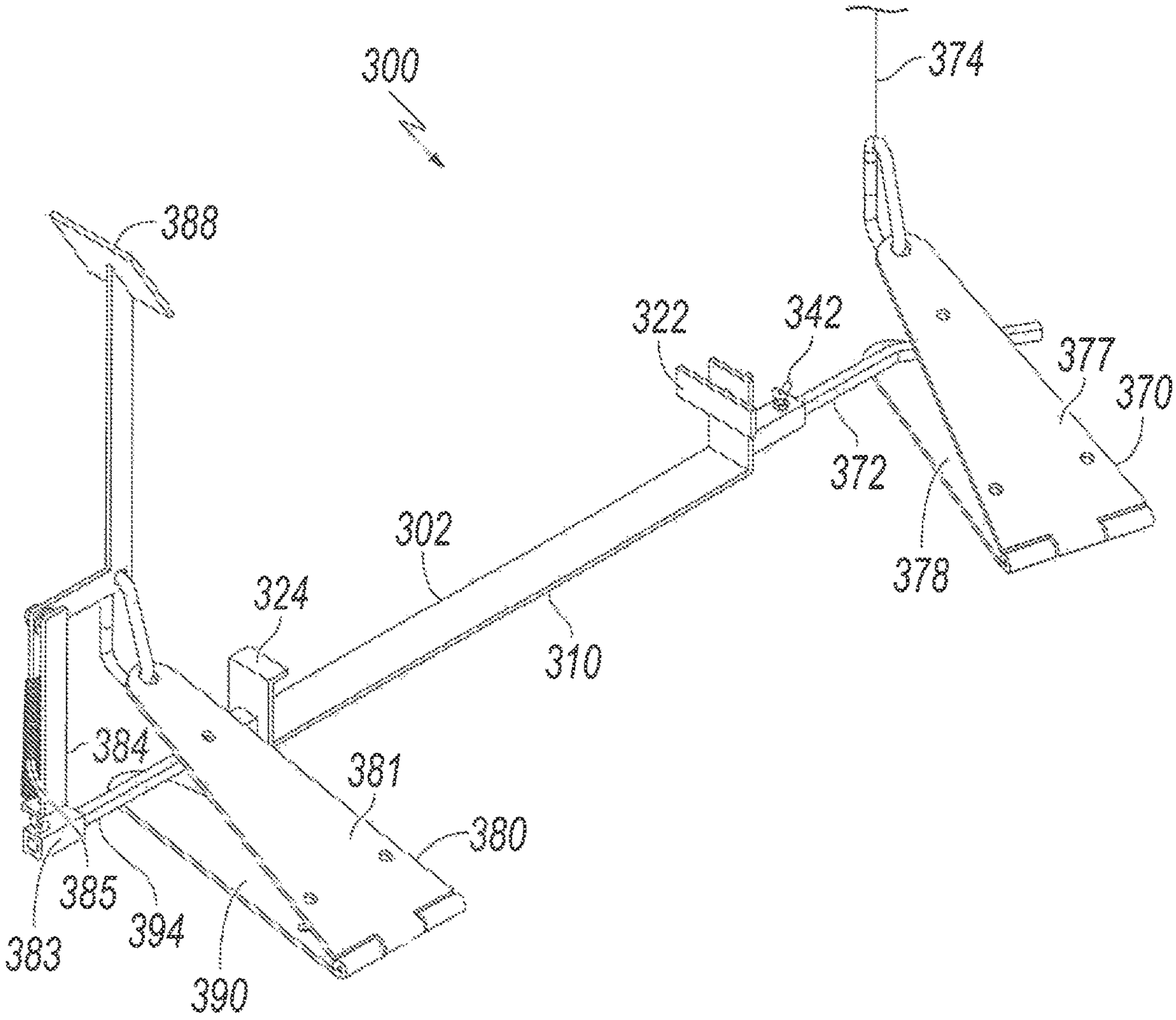
FIG. 15 illustrates a perspective view of another exemplary bottom module for the exemplary drum set of FIG. 1.

FIGS. 1-12 and 16-17 illustrate a variety of views of an exemplary drum set 10 built by a bucket 100 configured to contain drum components during storage or transportation mode and the bucket worked as a cajon during operation or play mode. FIGS. 13-15 illustrate views of exemplary bottom mounting members and modules for forming exemplary drum sets. In particular embodiments, bucket 100 and drum components form an extremely portable, all-inclusive drum set. Specifically, portability is a particular advantage of bucket drum set 10.

Bucket

Referring to the figures, bucket 100 can be any box-shaped container having a hollow interior 126 and may be defined by a right side 110, a left side 112, a front side 114, a rear side 116, a top side or opening 118, and a bottom side 120. A cover or lid 119 can be provided to cover the top side or opening 118 when bucket 100 is desired to be closed. In some embodiments, bucket 100 does not include a lid.

In particular embodiments, two rings or protrusions 150 can be provided near and around top side 118 to form a bend of trench 152 for receiving clamping elements 322, 324 from bottom module 300. Rings or protrusions 150 can also add stability to bucket 100 and can prevent distortion of bucket 100 when carried. In some embodiments, more or less than two rings or protrusions can be provided.

Particular embodiments of bucket 100 may be a polyhedron of any three dimensional shape, including, but not limited to, a cube, a cylinder that is round or having a top and bottom of any other polygonal shape, a pyramid that is upright or inverted, whole or bisected, having a base comprising a square or any other polygon, a circular prism, a rectangular prism, a square prism, and a cone, whole or bisected. In particular embodiments, bucket 100 may be a box, crate, case, chest, bongo, polygonal with supporting dome, or any other shape in which it would project a sound like a drum when any side of bucket is struck. In particular embodiments, sides 110, 112, 114, 116 may be non-perpendicular, at an angle more or less than 90° to top side 118 (or lid 119 if lid is used) and bottom side 120 of bucket 100. Alternatively, sides 110, 112, 114, 116 of bucket 100 may be perpendicular to top side 118 and bottom side 120 of bucket 100. In some embodiments, right side 110 or left side 112 of bucket 100 includes a thin plywood.

In some embodiments, strap (not shown) may be attached to bucket 100 to enable a person to easily carry bucket 100. Strap may be a single strap or multiple straps. Strap may be configured to enable a person to carry bucket 100 as backpack or messenger bag.

In some embodiments, bucket 100 is carried by hand hold (not shown). In some embodiments, hand hold can be placed on front side 114 and rear side 116 of bucket 100. Nevertheless, hand hold could be placed on any side of bucket 100. In some embodiments, hand hold can include an elongated hole in bucket 100. In some embodiments, there may be one or more hand holds on bucket 100. In some embodiments, hand hold may be a strap, grip, protrusion, or any other mechanism that enables a person to carry bucket 100.

In some embodiments, bucket 100 is carried by steel wire handle with plastic grip (not shown). In some embodiments, bucket 100 is a 5 or 6 gallon bucket originally designed for hauling water, paint, soil and other household or commercial items. In some embodiments bucket 100 is repurposed for use in a drum set in combination with bottom module 300.

Storage Mode

Figure 9:
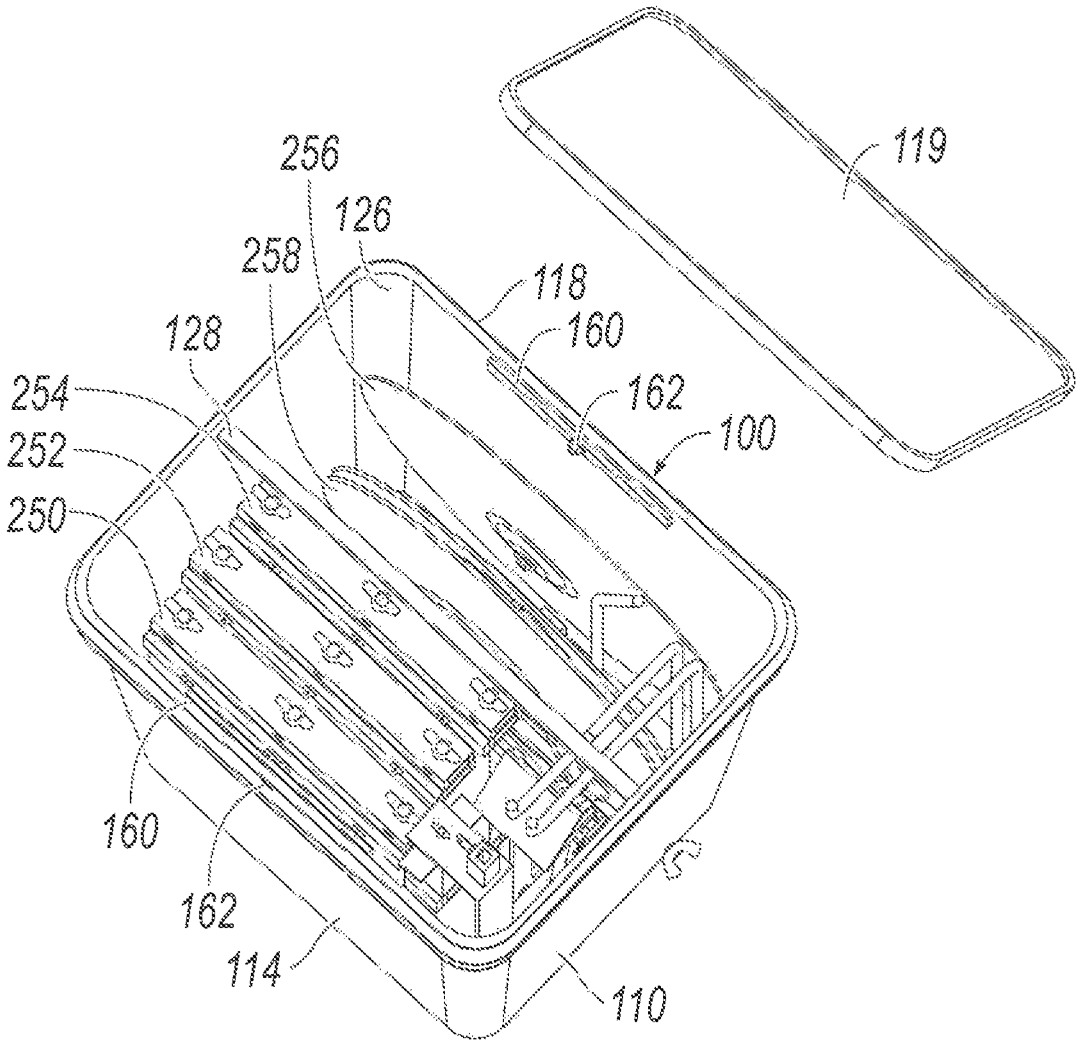
FIG. 9 illustrates a perspective view of the exemplary bucket for drum set of FIG. 1 with a lid been removed to show the interior of the bucket with components of the drum set stored in the that is in the interior space of the bucket.
Figure 10:
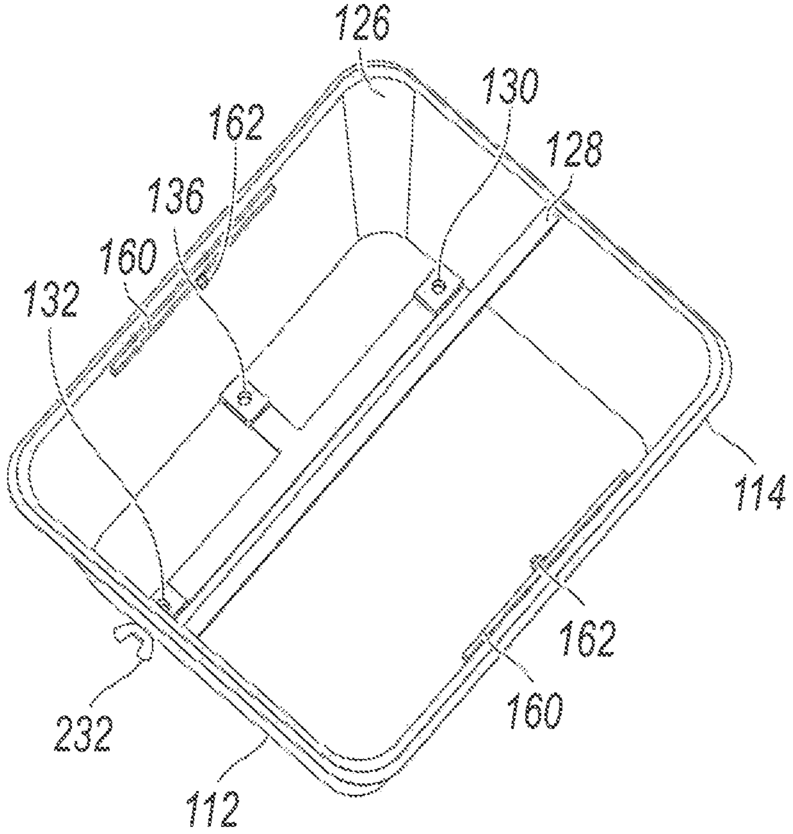
FIG. 10 illustrates a perspective view of the exemplary bucket for drum set of FIG. 1 with a lid and drum set components been removed to show the interior space of the bucket.
Figure 11:
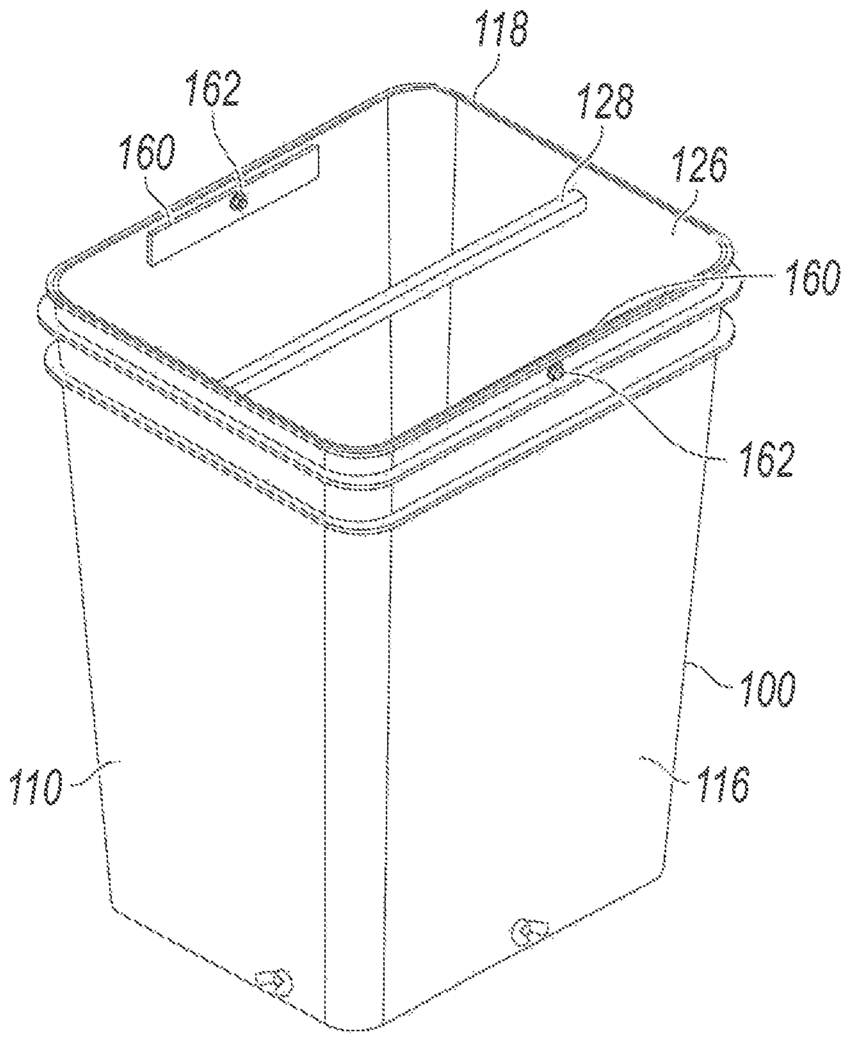
FIG. 11 illustrates another perspective view of the exemplary bucket for drum set of FIG. 1 with the lid and drum set components been removed to show the interior space of the bucket.

FIG. 9 illustrates an interior of bucket 100 with various components 250, 252, 254, 256, 258 stored within interior 126 of bucket 100. In the example embodiment shown in FIG. 9, additional drum components are stowed in interior 126 in deeper or lower locations and may or may not be seen from FIG. 9. In particular embodiments, drum components may be loosely stowed within bucket 100.

As best shown in FIGS. 9-12, interior 126 may include a horizontal stability rod 128 that protrudes from side 110 and is perpendicular to side 110. In particular embodiments, stability rod 128 is used to store drum components and/or provide extra reinforcement to the strength of bucket 100. In particular embodiments, stability rod 128 is comprised of wood, plastic, metal, or another solid material. In some embodiments, storage rod is not provided. In some embodiments, stability rod is not provided.

In some embodiments, interior 126 may include a storage brace (not shown) for securing toms or other components. In particular embodiments, storage brace may include a horizontal bar and a pair of vertical bars.

Figure 12:
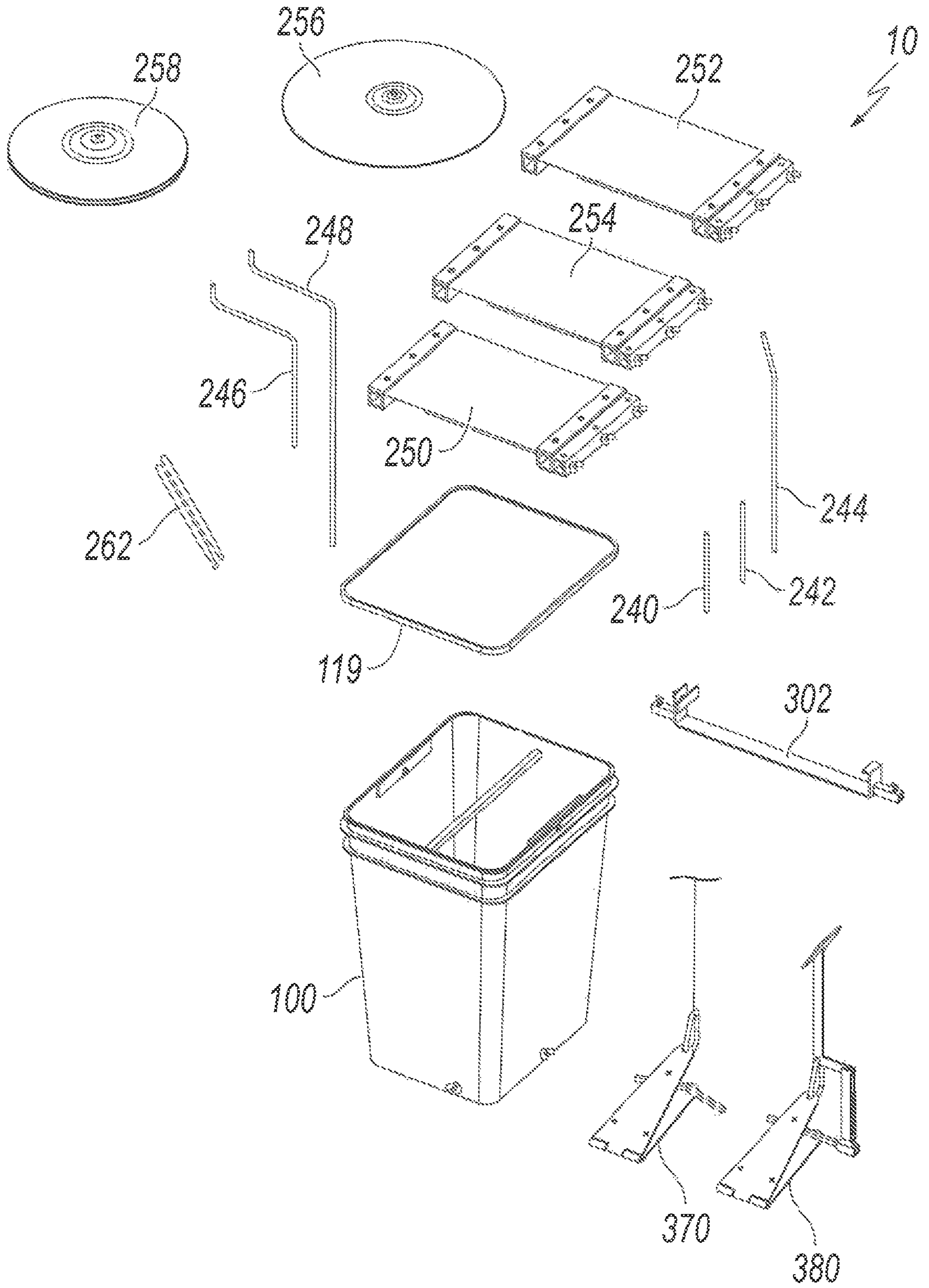
FIG. 12 illustrates a perspective exploded view of the exemplary bucket for drum set of FIG. 1.

FIG. 12 shows a perspective exploded view of the exemplary drum set 10 of FIG. 1 to illustrate the components been taken out from interior 126 of bucket 100. In addition to components 250, 252, 254, 256, 258, 370, 380, interior 126 of bucket 100 can also include component shafts or arms 240, 242, 244, 246, 248. In addition, interior 126 of bucket 100 can also include a bottom mounting member 302 configured to mount components 370, 380. In addition, interior 126 of bucket 100 can also include a pair of drum sticks 262.

Operation Mode

In particular exemplary embodiments, there are a number of features to enable bucket 100 to behave as a cajon. When components are all removed from bucket 100 and bucket 100 is placed bottom side up, it can be functioned as a cajon. In particular embodiments, bucket 100 has a top opening 118 from which sound emanates (when the lid 119 is removed) that top opening 118 can functionally behave as a sound hole. Although in particular embodiments bucket 100 has a top opening 118, an additional sound hole is located on any side of bucket 100. In particular embodiments, bucket 100 may have no additional sound hole at all or may have any number of sound holes.

Figure 17:
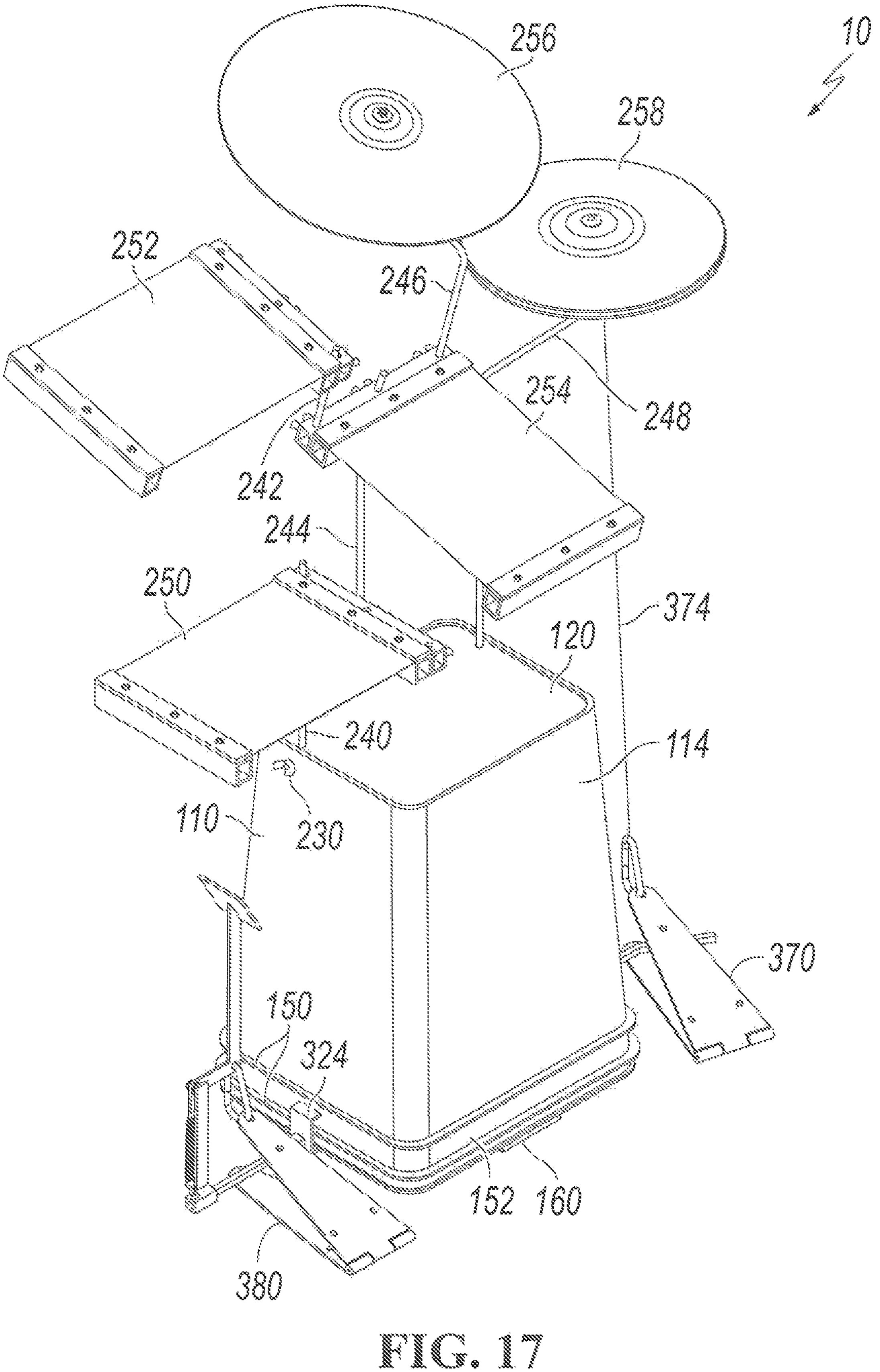
FIG. 17 illustrates a perspective view of another embodiment of the exemplary drum set of FIG. 1 in an usage position.
Figure 18:
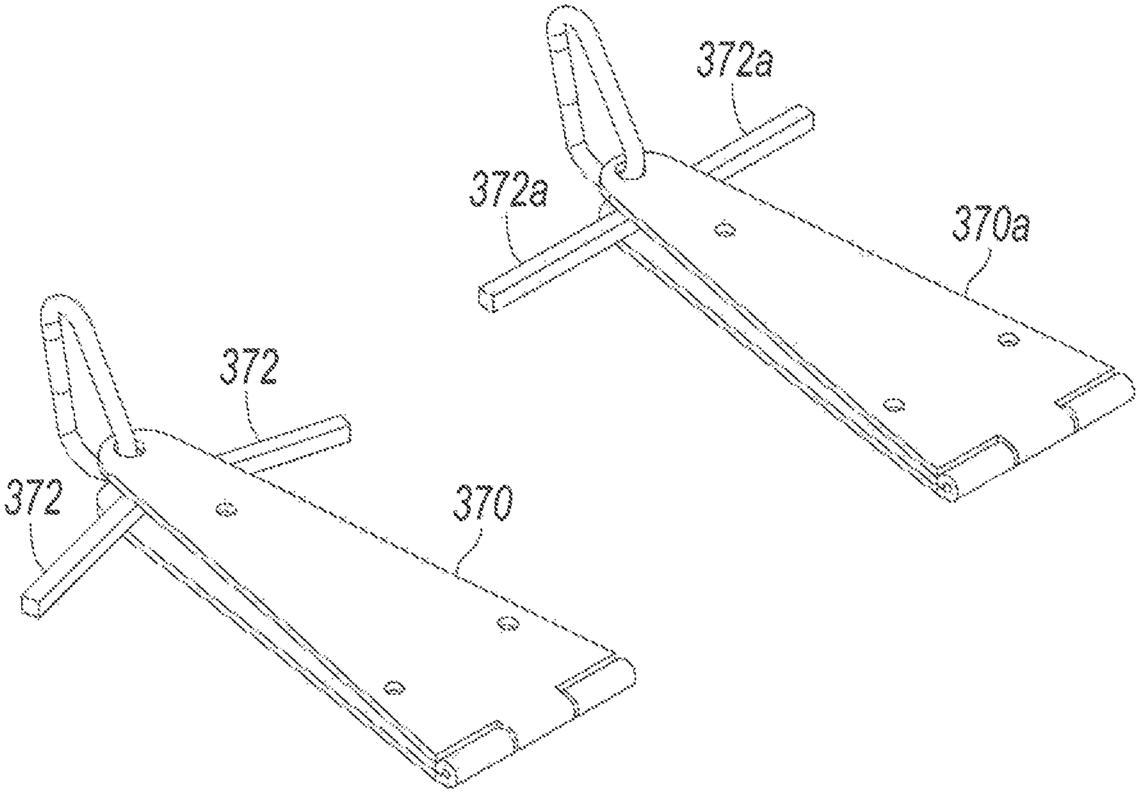
FIG. 18 illustrates a perspective view of two exemplary hi-hat pedal assemblies for the exemplary drum set of FIG. 1.

As shown in FIG. 17, when bucket 100 is placed bottom side up, bucket 100 has a striking side or striking head that may be struck by a beater of a drum kick assembly. When a beater strikes striking head 110, it creates oscillations on striking head 110 and sound waves carrying corresponding frequencies that travel through top opening 118. In particular embodiments, striking head 110 may include various shapes, including but not limited to a rectangle, square or other polygon having a plurality of sides. In particular embodiments, striking head 110 is comprised of the same material as bucket 100. In particular embodiments, striking head 110 is comprised of mylar. In particular embodiments, any one of the right side 110, left side 112, front side 114, or rear side 116 of bucket 100 can form the striking side.

As shown in FIG. 17, when bucket 100 is placed bottom side up, bucket 100 has a resonant side or head 112 that is positioned on the opposite side of striking side 110. In particular embodiments, left side 112 of bucket 100 formed the resonant side. When a beater strikes striking head 110, sound waves carrying resonant frequencies due to oscillations of resonant head 112 travel through top opening 118. In particular embodiments, resonant head 112 is comprised of the same dimension and the same material as striking head 110 to generate corresponding resonant frequency. In particular embodiments, resonant head 112 is comprised of mylar.

Top Components

When bucket 100 is placed bottom side up, an exemplary drum set 10 can be formed therefrom.

In particular exemplary embodiments, five component arms or shafts 240, 242, 244, 246, 248 are provided. In other embodiments, more or less than five component arms or shafts can be provided.

In particular exemplary embodiments, each of component arms or shafts 240, 244, 248 is configured to be clamped into a desired position by component shaft locking mechanisms 230, 232, 236, respectively, on bottom side of bucket 100 when bucket 100 is placed bottom side up.

Each of component shaft locking mechanisms 230, 232, 236 can include a component shaft hole and a clamping screw (e.g., thumb screw or a wing screw). Although component shaft locking mechanisms 230, 232, 236 are shown as a thumb screw or a wing screw, component shaft locking mechanisms 230, 232, 236 may be any suitable locking mechanisms for shafts.

Component shafts 240, 244, 248 can secured into place by component shaft locking mechanisms 230, 232, 236, respectively. Each of component shaft locking mechanisms 230, 232, 236 locks and unlocks to allow corresponding component shafts 240, 244, 248 to move up and/or move down freely or to securely fix component shafts 240, 244, 248 into a particular position. In particular embodiments, each of component shaft locking mechanisms 230, 232, 236 may allow corresponding component shafts 240, 244, 248 to rotate on its lengthwise axis or remain at a fixed rotation relative to bucket 100. In particular embodiments, there may be more or less component shafts depending on the number of desired components for drum kit 10.

In the exemplary embodiments illustrated in the figures, each of component shafts 240, 244, 248 is straight for at least a portion of its length. The straight portion of each of component shafts 240, 244, 248 is primarily so that component shafts may be locked at various heights. In particular embodiments, component shafts 240, 244, 248 may be entirely straight along its length or any other shape along its length facilitate fastening components to bucket 100.

In the exemplary embodiments illustrated in the figures, each of component shafts 240, 244, 248 is curved for another portion of its length. In particular embodiments, the curved portion of component shafts 240, 244, 248 is curved in the shape of an "L", or at any other degree or angle in which to allow each of the corresponding components to be extended away and fastened above bucket 100.

Component shafts 240, 244, 248 may be smooth, knurled, or spline. In particular embodiments, a portion of component shafts 240, 244, 248 may be smooth and another portion of component shafts 240, 244, 248 may be knurled. In particular embodiments, component shafts 240, 244, 248 may be smooth, knurled, or spline in its entirety. In particular embodiments, component shafts 240, 244, 248 may be solid or hollow. In particular embodiments. component shafts 240, 244, 248 may be made of any suitable material, including but not limited to wood, carbon fiber, fiberglass, metal, or plastic.

Referring to the figures, drum components 250, 254, 258 are mounted on or removably attached to component arms or shafts 240, 244, 248, respectively.

In particular embodiments, component 250 can be a snare drum. Snare drum 250 has a snare head for accepting striking and an opposing lower skin. In particular embodiments, snare drum 250 may have a frame comprising any shape, including but not limited to a square, rectangle, circle, or other polygon having a plurality of sides. In particular embodiments, snare drum 250 includes a series of stiff wires held under tension against the lower skin of the snare drum 250. In particular embodiments, snare drum 250 is composed of mylar. In particular embodiments, snare drum 250 is tunable. In particular embodiments, snare drum 250 is tuned by means of one or more rods. In particular embodiments, snare drum 250 is tunable and comprised of mylar.

In particular exemplary embodiments, component 254 may be one or more tom-tom drums. In particular embodiments, component 254 is one of a typical tom-tom drums, including a high tom and a low tom. Component 254 may include a cylindrical drum with no snares comprising a shell, a rim, and a head. In particular exemplary embodiments, component 254 is a tom-tom comprising a frame and a head. In particular embodiments, the tom drum 254 has a head comprising mylar. In particular embodiments, the tom drum 254 is a different size and pitch, such as hi, mid, or low. In particular embodiments, the tom drum 254 may have a frame comprising any shape, including but not limited to a square, rectangle, circle, or other polygon having a plurality of sides. In particular embodiments, the tom drum 254 is adjustable so that it may tuned to project sounds of different pitch. In particular embodiments, the tom drum 254 can be tuned by means of one or more tension rods.

In particular exemplary embodiments, component 258 is mounted on component shaft 248. In particular exemplary embodiments, component 258 is a pair of hi-hat cymbals.

As shown in the figures, component 254 can include a head secured by a frame or separated frames or rims. One or more rods can be provided, preferably positioned under head, to connect and reinforce frames. A mounting bar coupled to one of the frames can be provided for mounting component to a shaft or arm. In particular exemplary embodiments, mounting bar includes mounting holes with the longitudinal direction of holes in perpendicular to head. Each of the mounting holes has a corresponding mounting mechanism respectively. Thus, component 254 can be mounted to component arm or shaft 244 through one of the holes. As shown in the figures, component 254 is mounted to component arm or shaft 244 through the middle hole.

Additional components can be attached to component 254 through the remailing mounting holes on mounting bar of component 254. Thus, additional components can be attached to component 254 in a "piggy back" manner or erector kit-style of interconnected drum components.

In particular exemplary embodiments, as shown in FIG. 17, components 252 is attached to component 254 with component shaft 244 through the right mounting hole on mounting bar of components 252. In particular exemplary embodiments, component 252 is a high tom.

In particular exemplary embodiments, components 256 can also be attached to component 254 with component shaft 246 through the left mounting hole on mounting bar of components 252. In particular exemplary embodiments, component 256 is a cymbal. In particular embodiments, component 256 may be one or more cymbals. In particular embodiments, component 256 may be a crash, ride, or crash/ride cymbal.

Alternatively, multiple components can be mounted on or removably attached to the same component arm or shaft in a "stacked" manner. In some embodiments, components can be attached to bucket 100 in any combinations of "piggy back" and/or "stacked" manner to form a variety of different configurations.

Although particular components 250, 252, 254, 256, 258 are shown attached to specific component shafts 240, 242, 242, 246, 248, respectively, it is understood by one in the art that each of components may be attached to different component shafts in different configurations.

Bottom Module

Referring also to FIGS. 14-15, in particular exemplary embodiments, a bottom module 300 is configured to position under bucket 100 when bucket 100 is placed bottom side up. In particular exemplary embodiments, bottom module 300 is sized to cover and extend over top side 118 of bucket 100 when bucket 100 is placed bottom side up. In particular exemplary embodiments, bottom module 300 includes a bottom mounting member 302.

Referring also to FIG. 13, in particular exemplary embodiments, bottom mounting member 302 includes a bottom mounting frame 310. In some embodiments, bottom mounting frame 310 may be separatable into two or more pieces for storage or when in transportation. In particular embodiments, mounting frame 310 can be formed as a single rigid, non-foldable piece without a joint. Particular embodiments of bottom mounting frame 310 may be a polyhedron of any three dimensional shape, including, but not limited to, a parallelepiped, a rectangular parallelepiped, a tube, a bar, a cylinder that is round or having a top and bottom of any other polygonal shape with a longitudinal direction.

In particular embodiments, bottom mounting frame 310 may be made of any suitable material, including but not limited to wood, carbon fiber, fiberglass, metal, plastic, and the like. In particular embodiments, bottom mounting frame 310 is made by injection molding, 3-D printing or any other means known to those skilled in the art.

Bottom mounting frame 310 has a first end and a second end along the longitudinal direction of mounting frame 310. In particular exemplary embodiments, a first clamp 322 can be provided near the first end of mounting frame 310. In particular exemplary embodiments, a second clamp 324 can be provided near the second end of mounting frame 310. The first clamp 322 and second clamp 324 are configured to work together to fasten bottom mounting frame 310 (and bottom mounting member 302) under the top side of bucket 100 with the first clamp 322 and second clamp 324 clamping two opposite sides of bucket 100, respectively.

In particular exemplary embodiments, the first clamp 322 and second clamp 324 are sized to fit into the trench area 152 between rings 150 when bucket 100 is clamped by the first clamp 322 and second clamp 324.

A distance between the first clamp 322 and second clamp 324 can be adjusted or controlled by a bottom mounting member locking mechanism 332. In particular embodiments, bottom mounting member locking mechanism 332 is a clamping screw or clamping nut (e.g., thumb screw or a wing screw). When bottom mounting member 302 is placed under bucket 100, bucket 100 can be fastened to or released from, bottom mounting member 302 by rotating clamping screw 332 in one direction or another. Although bottom mounting member locking mechanism 332 is shown as a thumb screw or a wing screw, bottom mounting member locking mechanism 332 may be any suitable locking mechanisms.

Hi-Hat Pedal Assembly

Figure 16:
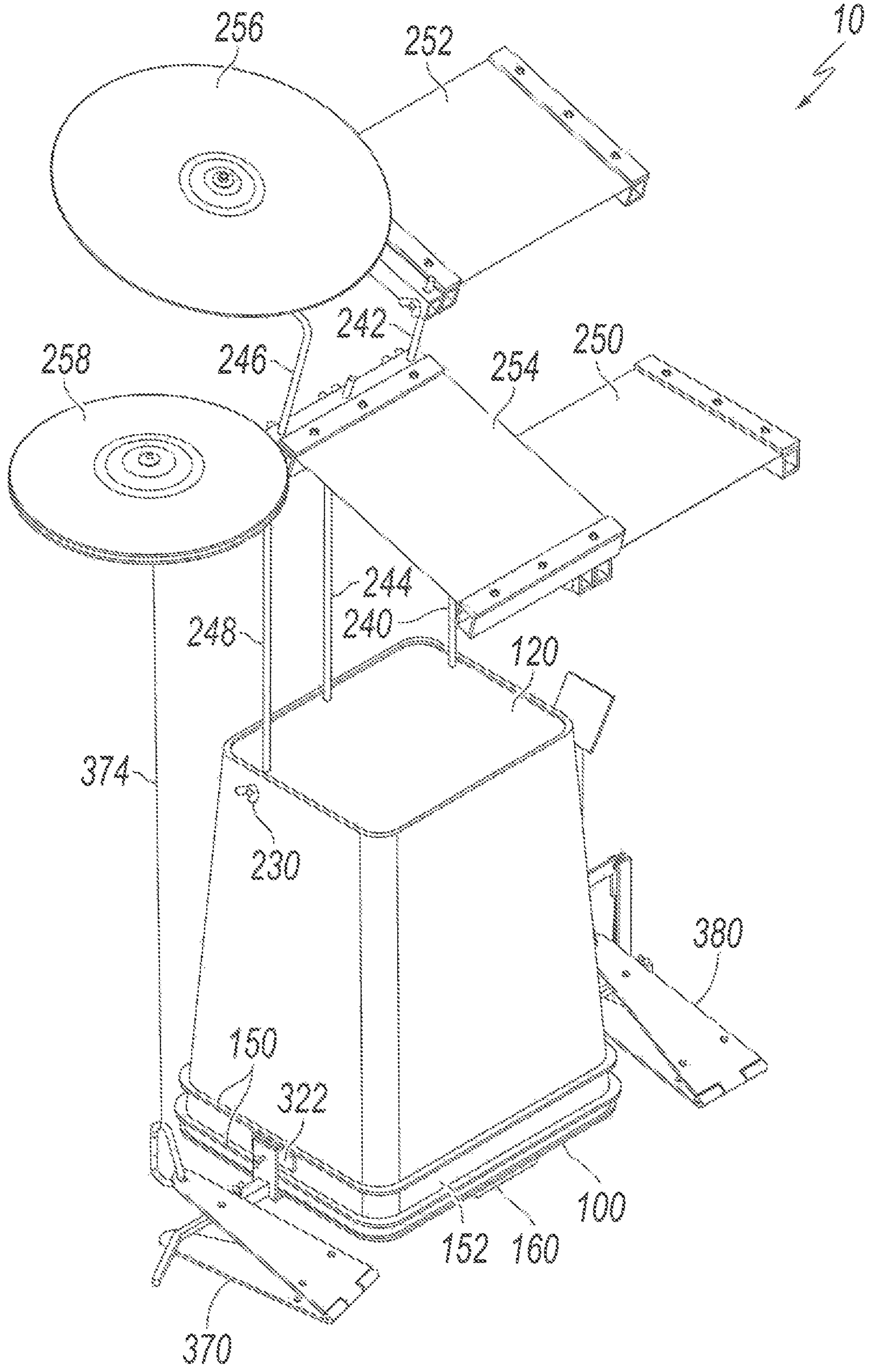
FIG. 16 illustrates a perspective view of an embodiment of the exemplary drum set of FIG. 1 in an usage position.

As is shown in FIGS. 14 and 16, hi-hat pedal assembly 370 can be positioned to the left of bucket 100 when the bucket is placed up-side-down so that a left foot of a drummer may operate hi hat pedal assembly 370 and pulling connector 374, thus, causing component 370 to project sound. In particular embodiments, pulling connector 374 may be a string, rope, cable or wire that is inelastic or elastic or sinewy material.

As is shown in the figures, hi-hat pedal assembly 370 includes a number of parts, including footboard 377, base plate 378 and connector 379. In particular embodiments, connector 379 is a heel hinge, such as a heel hinge that connects footboard 377 and base plate 378. In particular embodiments, pulling connector 374 is attached to footboard 377 opposite to connector 374.

In particular embodiments, hi-hat pedal assembly 370 is configured to have foot board 377 foldable over hi-hat plate 378 to reduce space occupied by the hi-hat pedal 370 to facilitate easier storage and/or transportation of the bucket drum set 10.

Referring also to FIGS. 14 and 16, hi-hat pedal assembly 370 has a sliding bar 372 configured to removably attach hi-hat pedal assembly 370 to bottom mounting member 302 or a pedal mount. In particular embodiments, bottom mounting member 302 or pedal mount has a slid or hole or channel 352 sized to removably receive sliding bar 372 that when sliding bar 372 is inserted into channel 352, hi-hat pedal assembly 370 is secured to bottom mounting member 302 or pedal mount. A sliding bar locking mechanism 342 can be provided that sliding bar 372 can be fastened to or released from channel 352. In particular embodiments, the sliding bar locking mechanism 342 includes a wing screw. In other embodiments, the sliding bar locking mechanism includes ball detents, ball plungers, or spring plungers.

Drum Kick Assembly

As is shown in FIGS. 14 and 16, drum kick assembly 380 can be positioned to the right of bucket 100 when the bucket is placed up-side-down so that a right foot of a drummer may operate drum kick assembly 380. In particular exemplary embodiments, drum kick assembly 380 can include a number of parts, for example, a drum pedal 381, a pedal rod 382, a kick pedal bar 383, a beater mount 384, a spring 385, a connector 386, a beater extension 387, a beater 388, a connector rod 389, and a drum kick plate 390.

In particular embodiments, drum pedal 381 has a heel hinge at one end of drum pedal 381. The other end of drum pedal 381 is attached to one end of the pedal rod 382. The other end of pedal rod 382 can be attached to the connector rod with a lever. One end of the connector rod is attached to one end of beater extension 387 which in turn also attached to beater 388 on the other end. The other end of the connector rod is connected to connector and biased by spring. The connector in turn is also connected to beater mount, which in turn is also connected to kick pedal bar 383.

When drum pedal 381 is pressed downward, it pulls pedal rod 382 downward, which generates an angular force to overcome the spring biased force from the spring to force the connector rod to rotate, which in turn pulls beater extension 387 toward strike side of bucket 100, which causes beater 388 to strike side. When drum pedal 381 is released, each moving component of drum kick assembly 380 moves in the opposite direction because the spring force from the spring rotates the connector rod, which in turn pulls beater extension 387 away from the striking side, returning drum pedal 381 and beater 388 into their original positions.

In particular embodiments, drum kick assembly 380 is configured to have drum pedal 381 foldable over drum kick plate 390 to reduce space occupied by the drum kick assembly 380 to facilitate easier storage and/or transportation of the bucket drum set 10.

In particular embodiments, drum kick assembly 380 has a sliding bar 394 configured to removably attach drum kick assembly 380 to bottom mounting member 302 or a pedal mount. In particular embodiments, bottom mounting member 302 or pedal mount has a slid or hole or channel 354 sized to removably receive sliding bar 394 that when sliding bar 394 is inserted into channel 354, drum kick assembly 380 is secured to bottom mounting member 302 or pedal mount. A sliding bar locking mechanism 344 can be provided that sliding bar 394 can be fastened to or released from channel 354. In particular embodiments, the sliding bar locking mechanism 344 includes a pair of wing screws. In other embodiments, the sliding bar locking mechanism includes ball detents, ball plungers, or spring plungers.

Left-Footer/Right-Footer

The configurations illustrated in FIGS. 14 and 16 and corresponding description are suitable for a drummer who is a right-footer that the right foot of the drummer is used to control the drum kick assembly 380 while the left foot of the drummer is used to control the hi-hat pedal assembly 370.

When a drummer who is a left-footer and wish to use the right foot to control the hi-hat pedal assembly 370 while using the left foot to control the drum kick assembly 380, the configurations illustrated in FIGS. 15 and 17 can serve the needs.

The drum kick assembly 380 can be configured to be suitable for either a right foot drummer or a left foot drummer that some components including the beater 388, beater extension 387, kick pedal bar 383, beater mount 384, spring 385, connector 386, and sliding bar 394 are rotatable 180° relatively to the drum pedal 381 and drum kick plate 390. A rotation axis can be provided between the intersection of the sliding bar 394 and drum kick plate 390 to facilitate the configurations.

When drum kick assembly 380 is configured to be suitable for a left-footer as shown in FIGS. 15 and 17, bottom mounting member 302 can be rotated 180° as that of the right-footer configuration that sliding bar 394 is configured to removably attach drum kick assembly 380 to bottom mounting member 302 through channel 354 with sliding bar locking mechanism 344.

The hi-hat pedal assembly 370 can be configured to be suitable for either a right foot drummer or a left foot drummer that the sliding bar 372 can be extended in both the left side and right side of the hi-hat pedal assembly 370 that when left foot drummer is preferred, the left side of the sliding bar 372 is used to removably attach hi-hat pedal assembly 370 to bottom mounting member 302 through channel 352 with sliding bar locking mechanism 342.

Thus, the drum set 10 described herein is configured to be played by either a left-footer or a right-footer with the same bottom module 300 including the same bottom mounting member 302, drum kick assembly 380, and hi-hat pedal assembly 370.

One of the advantages of having the same drum kick assembly 380 and hi-hat pedal assembly 370 set up for right-footer or left-footer is that when the pedestal is taken off to switch sides and has not yet been reattached, the kick pedal collapses flat which makes it easier to transport as it is not at an angle as when assembles but, rather, it is collapsed flat.

Swivel Feet

In particular exemplary embodiments, leveling component such as swivel feet or foot 160 can be provided on the internal side of front side 114 and the internal side of rear side 116 near top side 118 of bucket 100. Swivel foot 160 can be attached to the internal sides of bucket 100 through, for example, rivet 162.

When bottom module 300 is position under bucket 100, which is placed bottom side up, the depth of the bottom frame 310 may cause top side of bucket 100 not fully touched with the ground or platform where bucket 100 is sit. This may cause the drum set 10 unstable. In particular exemplary embodiments, two swivel foot 160 are provided and configured to be switchable over top side 118 to a desired length extended over top side and can be locked at desired position that the combination of bottom frame 310 and swivel foot 160 can form a relatively flatten foundation for bucket 100 when drum set 10 is in operation mode as shown in FIGS. 16-17. Swivel foot 160 can be switched back under top side 118 and be covered by lid 119 during storage mode.

Alternatively, two notches may be provided along the top side on the left side and right side of bucket so that the bottom frame 302 can sit in the notches that when set up, the top side of bucket 100 can be flashed with the bottom frame 302 and a stable foundation of the drum set 10 can be formed.

Methods

Methods of assembly a drum set that includes one or more of the various foregoing aspects are also encompassed herein. Assembly steps for building a drum set with a bucket preferably include: (1) remove components stored inside of bucket 100, (2) turn bucket 100 up-side-down, (3) mounting bottom mounting member 302 to bucket 100, (4) mounting hi-hat pedal assembly 370 to bottom mounting member 302, (5) mounting drum kick assembly 380 to bottom mounting member 302, (6) mounting one or more component shafts 240, 244, 248 to desired locations on the bottom side of bucket 100, (7) mounting each of components 250, 254, 258 to a desired location of one of component shafts 240, 244, 248, (8) piggy back mounting one or more component shafts 242, 246 to a desired location of component 254, (9) mounting one or more components 252, 256 to a desired location of one of the component shafts 242, 246, and (10) connecting the pulling connector 374 between the hi-hat cymbals component 258 and the hi-hat pedal assembly 370. One or more steps may be omitted if a smaller kit is desired.

In particular embodiments, the step of (3) mounting the bottom mounting member 302 to bucket 100 is performed by adjusting the bottom mounting member locking mechanism 332 to clamp bucket 100 with the first clamp 322 and second clamp 324.

In particular embodiments, the step of (4) mounting the hi-hat pedal assembly 370 to the bottom mounting member 302 is performed by inserting sliding bar 372 of hi-hat pedal assembly 370 to channel 352 of bottom mounting member 302.

In particular embodiments, the step of (5) mounting the drum kick assembly 380 to bottom mounting member 302 is performed by inserting sliding bar 352 of drum kick assembly 380 to channel 354 of bottom mounting member 302.

Disassembly the drum set that includes one or more of the various foregoing aspects can be performed in a reversed order of the processing steps (1)-(10) described above.

In particular embodiments, bucket 100 is repurposed for use in a drum set in combination with bottom module 300 by mounting bottom mounting member 302 to bucket 100 where bucket 100 was originally designed for another purpose.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A drum set comprising:

a bucket having a top opening, a bottom side, a striking side, an opposing resonant side, and two other sides;

a plurality of upward extending component mounting shafts removably attached to the bottom side of the bucket when the bucket is placed bottom side up;

one or more percussion modules, each of the one or more percussion modules is configured to removably attach to one or more of the plurality of component mounting shafts, wherein each of the one or more percussion modules produces a sound in response to being struck or scraped;

two pedal mounts attached under the top opening of the bucket;

a drum kick assembly removably attached to one of the two pedal mounts and positioned on the striking side of the bucket and including a beater positioned to strike the striking side of the bucket to produce a sound; and a hi-hat pedal assembly removably attached to another one of the two pedal mounts and positioned on the resonant side of the bucket.

2. The drum set of claim 1 further comprising a lid configured to removably cover the top opening of the bucket.

3. The drum set of claim 1 wherein the bucket including two rings near and around top side to form a bend of trench.

4. The drum set of claim 1, wherein each of the plurality of component mounting shafts is supported by a component shaft locking mechanism.

5. The drum set of claim 1, wherein the one or more percussion modules are one or more of a snare drum, a high tom, a low tom, a hi-hat cymbals, and a cymbal.

6. The drum set of claim 5, wherein each of the high tom and the low tom includes a mounting bar having more than one mounting mechanisms configured to mount the high tom and the low tom in a variety of configurations.

7. The drum set of claim 6, wherein the high tom is attached to the low tom in a piggy back manner.

8. The drum set of claim 6, wherein the cymbal is attached to the low tom in a piggy back manner.

9. The drum set of claim 1, wherein the hi-hat pedal assembly has a footboard, a base plate and a connector connecting the footboard and base plate.

10. The drum set of claim 1, wherein the hi-hat pedal assembly having a sliding bar configured to removably attach the hi-hat pedal assembly to one of the two pedal mounts.

11. The drum set of claim 10, wherein the hi-hat pedal assembly is positioned on the left side of the bucket when the bucket is placed up-side down.

12. The drum set of claim 10, wherein the hi-hat pedal assembly is positioned on the right side of the bucket when the bucket is placed up-side down.

13. The drum set of claim 1, wherein the drum kick assembly having the a drum pedal foldable over a drum kick plate.

14. The drum set of claim 1, wherein the drum kick assembly having a sliding bar configured to removably attach the drum kick assembly to the one of the two pedal mounts.

15. The drum set of claim 14, wherein the drum kick assembly is positioned on the left side of the bucket when the bucket is placed up-side down.

16. The drum set of claim 14, wherein the drum kick assembly is positioned on the right side of the bucket when the bucket is placed up-side down.

17. The drum set of claim 1 further comprising a stability rod protruded from the interior of the bucket and is perpendicular to the striking side.

18. The drum set of claim 17, wherein the stability rod extended to the exterior of the bucket and form the pedal mounts.

19. The drum set of claim 17 further comprising one or more storage bags secured to the stability rod.

20. The drum set of claim 1 further comprising a storage brace having a horizontal bar and at least one vertical bar configured to secure at least one of the one or more percussion modules.

* * * * *